United States Patent
Fujita et al.

[11] Patent Number: 6,118,435
[45] Date of Patent: Sep. 12, 2000

[54] DISPLAY UNIT WITH TOUCH PANEL

[75] Inventors: Toshihiro Fujita; Akito Okamoto; Takuya Shioji; Keisuke Inaoka; Tomonori Nishiki; Masahiko Kawakami, all of Osaka, Japan

[73] Assignee: Idec Izumi Corporation, Osaka, Japan

[21] Appl. No.: 09/056,870

[22] Filed: Apr. 8, 1998

[30] Foreign Application Priority Data

| Apr. 10, 1997 | [JP] | Japan | 9-110187 |
| Apr. 18, 1997 | [JP] | Japan | 9-116409 |

[51] Int. Cl.[7] .................................................. G09G 5/00
[52] U.S. Cl. ............................................................ 345/173
[58] Field of Search ................................... 345/173, 174, 345/175, 176, 177, 178, 179, 180, 181, 182, 183; 178/18.01, 18.1, 19.04, 19.01, 18.02, 18.04

[56] References Cited

U.S. PATENT DOCUMENTS

| 4,862,151 | 8/1989 | Grauz et al. | 345/173 |
| 4,914,624 | 4/1990 | Dunthorn | 345/173 |
| 5,402,151 | 3/1995 | Duwaer | 345/173 |
| 5,563,632 | 10/1996 | Roberts | 345/173 |
| 5,977,867 | 11/1999 | Blouin | 345/173 |

FOREIGN PATENT DOCUMENTS

| 63-164127 | 10/1988 | Japan . |
| 2-105919 | 4/1990 | Japan . |
| 6-139018 | 5/1994 | Japan . |

Primary Examiner—Xiao Wu
Attorney, Agent, or Firm—Griffin & Szipl, P.C.

[57] ABSTRACT

A display unit with touch panel includes a press detection switch for detecting a press on a touch panel at a pressure exceeding a predetermined level so as to output a press detection signal, a driving-signal generating circuit responding to the press detection signal to generate a driving signal, a driving portion actuated by the driving signal to drive the touch panel into displacement thereby providing an operator with a tactile feedback, and an AND circuit for outputting an AND signal upon receipt of both of a coincidence detection signal from a coincidence detecting circuit and the press detection signal from the press detecting switch, and a gate circuit for inhibiting a passage of the operated-position signal from the operated-position detecting circuit when the AND signal from the AND circuit is not supplied and permitting the passage of the operated-position signal when the AND signal from the AND circuit is supplied. The display unit with touch panel ensures the prevention of operation errors caused by the operator merely sliding his finger on the touch panel or accidentally touching the touch panel.

17 Claims, 9 Drawing Sheets

DISPLAY UNIT WITH TOUCH PANEL

BACKGROUND OF THE INVENTION

1. Field of the Invention

The present invention relates to a display unit with touch panel for use in operation devices such as employed by FA (factory automation) apparatuses, vending machines, automatic ticket venders, information apparatuses, household electrical appliances, medical instruments and the like.

2. Description of the Background Art

Conventional display units with touch panels are constructed as shown in FIG. 1. The display units are used in the operation stations of the FA (factory automation) apparatuses or in the operation switch portions of the vending machines, automatic ticket venders, information apparatuses, household electrical appliances, medical instruments and the like.

Such a display unit with touch panel has a construction wherein a touch panel 102 is fixed at place above and close to a display body 101 with a display screen for displaying image information including characters, patterns, symbols and the like, based on image data outputted from an image data output device such a computer.

A typical example of the display body 101 is composed of a liquid crystal display.

The touch panel 102 includes a plurality of switch portions (m×n) arranged in a matrix of M-rows and N-columns (hereinafter, M and N each indicate an integer of not smaller than 1) in the XY directions perpendicular to each other. These switch portions feature a substantially zero depression stroke such that an operator can operate the switch portions by lightly touch or press them. The touch panel 102 outputs two types of signals for indication of an operated position, which signals include an n-component positional signal XS (n=1, . . . , N) indicative of the position on the X-axis and an m-component positional signal YS (m=1, . . . , M) indicative of the position on the Y-axis. The touch panel 102 is formed of a transparent or translucent material for allowing light from the display body 101 therebelow to pass therethrough. A typical example of the touch panel 102 is of a resistance type.

The component positional signals XS and YS from the touch panel 102 are supplied to an operated-position detecting circuit 103. The operated-position detecting circuit 103, in turn, detects coordinates (Xn, Ym) of an operated position on the touch panel 102 based on the component positional signals XS and YS and then outputs an operated-position signal PS indicative of the operated position on the panel. Thus, the position at which the touch panel 102 is operated can be determined from the operated-position signal PS.

The touch panel 102 of the construction shown in FIG. 11 allows for the minimization of the thickness thereof and offers a high degree of freedom to define a region practically used as switch. Unfortunately, however, the touch panel is adapted to respond to an impact no stronger than an operator's light touch on the switch portion of the touch panel 102. This leads to a fear that when the operator accidentally touches the surface of the touch panel 102 or merely traces switches on the touch panel 102 for confirmation of display content or such, an operated-position signal PS indicative of a position at which the operator has touched the touch panel 102 may be supplied from the operated-position detecting circuit 103 to a subsequent circuit, resulting in an operation error of a subsequent external device due to the mistake of the operator. Particularly, in the case of a production line of a factory where the operation station for controlling the production process is equipped with such a display unit with touch panel, the operator normally pays his attention solely to the movement of the production line but not so far as to what portion of the touch panel he touches. Hence, the operation error is apt to occur.

In the case of the construction shown in FIG. 11, the touch panel 102 does not allow the operator to depress the switch portion thereof so that the operator cannot obtain any tactile-response to the operation of the switch portion. That is, the touch panel 102 cannot give a tactile feedback to the operator when responding to the operation of the switch portion thereof.

Similarly to the resistance type touch panel, the aforementioned problem also exists with the touch panel 102 of other types such as ultrasonic type, photoelectric type, capacitance type and the like.

In the case of the photoelectric type touch panel, in particular, a light emitting device emit light beams in a matrix pattern at a level slightly away from the surface of the touch panel 102 to be touched by the operator and therefore, some of the light beams from the light emitting device are cut off by an operator's finger before the operator actually touches the surface of the touch panel 102. This results in a trouble that although the operator does not touch the touch panel 102, the operated-position detecting circuit 103 supplies to a subsequent external device an operated-position signal PS indicative of a position corresponding to where the light beams are cut off.

SUMMARY OF THE INVENTION

It is therefore, an object of the invention to provide a display unit with touch panel adapted to prevent the occurrence of operation errors caused by the operator merely tracing switches on the touch panel or accidentally touching the touch panel.

The display unit with touch panel in accordance with the invention comprises a display body having a display screen for displaying images such as characters, patterns, symbols and the like; a transparent or translucent touch panel disposed above the display screen of the display body; and operated-position detecting means for detecting a place at which an operator touches the touch panel, the touch panel outputting at least one type of component positional signal indicative of the place touched by the operator, the operated-position detecting means receiving the component positional signal from the touch panel so as to detect the place touched by the operator and to output an operated-position signal indicative of the place thus detected, the display unit with touch panel further comprising switch-region defining means, coincidence detecting means, press detecting means and output control means.

The switch-region defining means defines a region used as switch in the overall touchable area of the touch panel.

The coincidence detecting means compares a switch region defined by the switch-region defining means with a position or place detected by the operated-position detecting means and outputs a coincidence detection signal when determining that the position or place detected by the operated-position detecting means overlaps with the switch region.

The press detecting means detects a press on the touch panel when the operator touches and presses the touch panel, and then outputs a press detection signal.

The output control means either permits or inhibits a flow of the operated-position signal from the operated-position detecting means to an external output terminal, the flow of the operated-position signal to the external output terminal permitted on condition that both the coincidence detection signal and the press detection signal are supplied to the output control means.

According to this invention, the output control means inhibits the flow of the operated-position signal from the operated-position detecting means to the external output terminal unless both the coincidence detection signal from the coincidence detecting means and the press detection signal from the press detecting means are supplied to the output control means. Therefore, the operated-position signal is not supplied to an external device when the operator merely slides his finger on the touch panel surface or traces switches on the touch panel or when accidentally touches the touch panel.

When the operator touches a switch region of the touch panel, which is defined by the switch-region defining means, and then presses the switch region with a pressure, the coincidence detection signal is outputted from the coincidence detecting means while the press detection signal is outputted from the press detecting means so that both the coincidence detection signal and the press detection signal are supplied to the output control means. Thus, the output control means permits the flow of the operated-position signal from the operated-position detecting means to the external output terminal.

Therefore, when the operator merely traces switches on the touch panel or accidentally touches the touch panel, the operated-position signal is not supplied to the external device, which ensures the prevention of the occurrence of operation errors.

DESCRIPTION OF THE PREFERRED EMBODIMENTS

Now, the preferred embodiments of the invention will hereinbelow be described by way of reference to the accompanying drawings.

Figure 1:
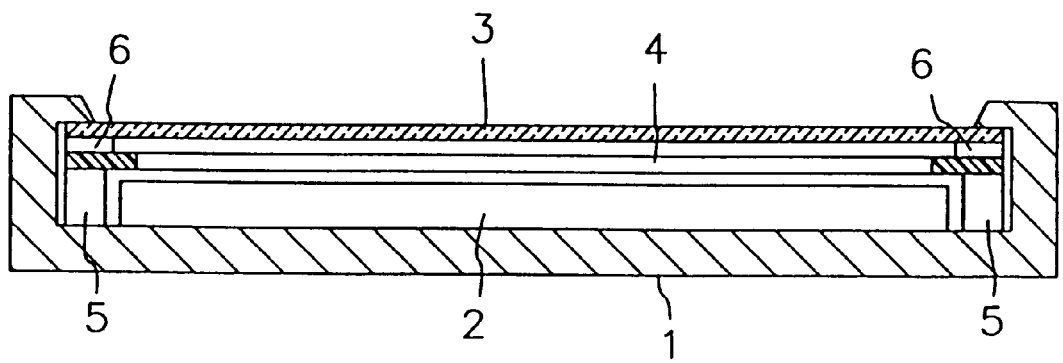
FIG. 1 is a sectional view showing a first embodiment of the invention.
Figure 2:
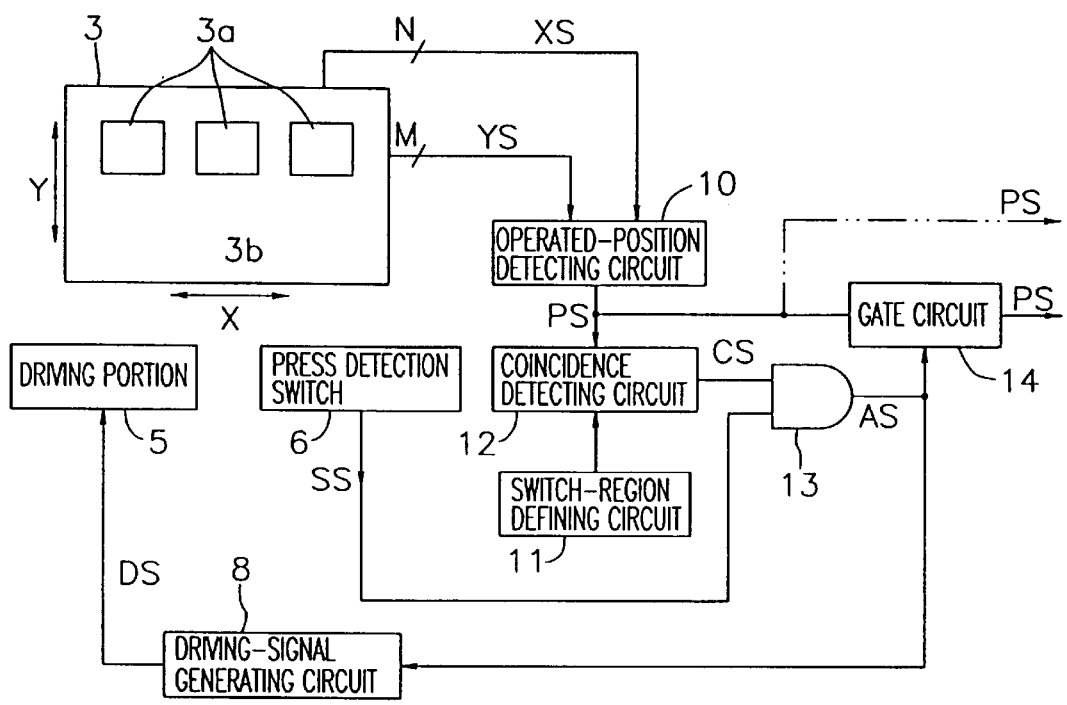
FIG. 2 is a block diagram showing an electric circuit in accordance with the first embodiment of the invention.

FIGS. 1 and 2 illustrate a display unit with touch panel according to a first embodiment of the invention.

First, referring to FIG. 1, the display unit with touch panel has a construction which includes a case 1 such as formed of a metal, a display body 2 having a display screen for displaying images including characters, patterns, symbols and the like and accommodated by the case 1, and a touch panel 3 disposed above and close to the display screen. In many cases, the touch panel 3 is supported by a touch-panel support plate 4 which is formed into a frame-like structure by cutting away a central portion of a plate such as formed of a resin material thereby to leave only a peripheral portion of the plate.

Disposed under the touch panel 3 and the touch-panel support plate 4 is at least one driving portion 5 for mechanically driving the touch panel 3 and the like thereby to give a tactile feedback, such as vibration, to an operator of the touch panel 3. The driving portion 5, constituting the driving means, retains the whole bodies of the touch-panel support plate 4 and the touch panel 3 within the case 1.

Within the case 1, a press detection switch 6 is provided between the touch panel 3 and the touch-panel support plate 4 therebelow for detection of a press on the touch panel 3 at a pressure greater than a predetermined level Pt and for output of a press detection signal SS (see FIG. 2). The press detection switch 6 constitutes the press detecting means. The predetermined pressure Pt in this case means a pressure such as to cause the press detection switch 6 to output the press detection signal SS.

The press detection switch 6 may be provided at one place or at more than one places of the peripheral portion of the touch panel 3. The press detection switch 6 may employ a contact type switch, such as a contact switch, or a non-contact type switch, such as a photoelectric switch. Otherwise, the press detection switch may employ a pressure sensitive switch composed of a piezoelectric element, a magnetic switch composed of a Hall-effect IC and the like.

The press detection switch 6 may be disposed at place other than that shown in FIG. 1, such as a place between the touch-panel support plate 4 and the driving portion 5 supporting the plate 4, a place between the touch-panel support plate 4 (or the touch panel 3) and the case 1, and the like. In short, the press detection switch 6 may be disposed at any place as long as it can detect that the touch panel 3 is pressed at a pressure greater than the predetermined level Pt.

In principle, the aforesaid display body 2 is at least required to have a function to display image information including characters, patterns, symbols and the like and it does not matter whether the display body shows a fixed information which does not vary or a variable information which varies in color, shape, display position and the like.

It also does not matter whether the display body 2 emits light by itself or includes a discrete illuminant such as a back light. More specifically, the display body 2 typically cosists of a liquid crystal display but may alternatively consist of an EL (electroluminescent) display, plasma display, CRT, LED array or a combination of a name plate or a liquid crystal shutter with an illuminant and a reflecting plate for illuminating the above. Otherwise, even a mere sheet of paper or plate carrying information thereon is also usable.

Among others, the liquid crystal display is relatively less costly and offers easy definition or changes of the number, size, layout and the like of a switch region 3a (see FIG. 2).

Where the display body 2 is of an extremely thin material such as paper and a sheet, such a display body may be attached to the back surface of the touch panel 3.

In a case where the display body 2 consists of a CRT, the CRT preferably has a flat screen. As a matter of course, the CRT may have a generally known curved screen. It is to be noted that in the case of the CRT with the curved screen, the touch panel 3 preferably is of a curved shape having the same curvature with that of the curved screen so as to be uniformly spaced from the CRT screen.

It is preferred that the display body 2 shows an image information in the vicinity of a lower portion of each switch region 3a, the image information including a diagram indicative of a switch to be selected by operating the switch region 3a and characters indicating a function of the switch. Such a display body allows the operator to readily select a desired switch region 3a for operation thereof. The image information of this instance includes that presented through an electronic processing based on image data supplied from an image data output device, such as a computer, that directly drawn on or bonded to the display screen, and the like.

A typical example of the touch panel 3 includes the resistance type touch panel which includes a transparent or translucent resistance film for allowing the passage of light from the display body 2 therebelow.

The touch panel 3 has a transparent substrate and transparent electrodes arranged in an orthogonal matrix of M-rows and N-columns wherein each intersection point of the transparent electrodes defines a switch portion. The touch panel 3 outputs an n-component positional signal XS indicative of a position n (n=1, . . . , N) on the X-axis and an m-component positional signal YS indicative of the position m (m=1, . . . , M) on the Y-axis for two-dimensional expression of the operated position.

Besides the resistance type touch panel, the touch panel 3 may employ a photoelectric type touch panel wherein light beams running from a light emitting device to a photodetector are cut off or attenuated by a finger or the like for detection of an operated position, an ultrasonic type touch panel wherein ultrasonic waves propagated from an ultrasonic generator to an ultrasonic receiver are blocked or attenuated by a finger or the like for detection of an operated position, a capacitance type touch panel adapted to detect a position touched by a finger or the like based on the variation of the capacitance, and the like.

The touch-panel support plate 4 is provided for the reinforcement of the touch panel 3. Accordingly, where the touch panel 3 itself has such a degree of strength as not to be deformed when the operator depresses the touch panel, there is no need for especially providing such a touch-panel support plate 4.

Where the touch-panel support plate 4 has a frame-like construction formed by cutting away a portion thereof slightly smaller in size than an outside shape of the touch panel 13, as shown in FIG. 1, the touch-panel support plate 4 may be formed of an opaque material. On the other hand, where the touch-panel support plate 4 has a plate-like construction instead of the frame-like construction of FIG. 1, it is preferred to form the touch-panel support plate 4 of a transparent or translucent material.

The driving portion 5 may be provided at only one place or at more than one places on the peripheral portion of the touch panel 3. The driving portion 5 operates to drive the touch panel 3 into displacement. Examples of an element usable as the driving portion 5 include a piezoelectric vibrator, a combination of an electromagnetic solenoid and a plunger, a combination of an electromagnet and a permanent magnet, a vibrating motor with an eccentric weight, and the like.

The followings exemplify a mode wherein a driving-signal generating circuit 8 as driving-signal generating means and the aforesaid driving portion 5 in association operate to drive the touch panel 3 into displacement thereby giving the operator a tactile feedback: a) oscillating the touch panel 3 at a predetermined frequency; b) driving the touch panel 3 into a momentary horizontal sliding movement (one shot); c) suddenly sliding the touch panel 3 in a horizontal direction and maintaining the panel at place while the panel is depressed; d) driving the touch panel 3 into a momentary retraction (one shot); e) driving the touch panel 3 into a sudden retraction and maintaining the panel at place while the touch panel 3 is depressed; f) driving the touch panel 3 into a momentary elevation (one shot); g) suddenly elevating the touch panel 3 and maintaining the panel at place while the panel 3 is depressed, and the like.

Specific examples of a driving signal DS supplied from the driving-signal generating circuit 8 to the driving portion 5 are as follows: in the case of (a), an AC signal may be supplied; in the cases of (b), (d) and (f), a pulse signal may be supplied; and in the cases of (c), (e) and (g), a DC signal may be supplied.

Specific examples of the tactile feedback given to the operator are as follows: in the case of (a), vibration is fed back to the operator at his finger and the like; in the cases of (b) to (e), both a stroke touch associated with depressing the switch portion at a given stroke and a click touch associated with clicking the switch portion are fed back to the operator at his finger and the like; and in the cases of (f) and (g), a click touch associated with quickly depressing the touch panel 3 and with a sudden elevation of the touch panel 3 is fed back to the operator at his finger and the like.

Now referring to FIG. 2, the electric circuit will be described. In addition to the aforesaid depression detection switch 6 and the driving-signal generating circuit 8, this display unit with touch panel further includes an operated-position detecting circuit 10, a switch-region defining circuit 11, a coincidence detecting circuit 12, an AND circuit 13 and a gate circuit 14.

The operated-position detecting circuit 10 detects coordinates (Xn, Ym) of a position, at which the operator has operated the touch panel 3, based on component positional signals XS and YS supplied from the touch panel 3 so as to output an operated-position signal PS indicative of the operated position. The operated-position signal PS indicates to the operator a position at which the operator has operated the touch panel 3. The operated-position signal PS is applied to the gate circuit 14 as well as to the coincidence detecting circuit 12. The operated-position detecting circuit 10 constitutes the operated-position detecting means.

The switch-region defining circuit 11 defines one or more switch-regions 3a practically used as the switch of the touch panel 3. Although the touch panel 3 includes, in its surface area, a plurality of switch portions arranged in a matrix pattern, as described in the foregoing, normally used as the switch is not all the touchable area of the touch panel but only a limited area thereof. Accordingly, the switch-region defining circuit 11 determines what portion of all the touchable area to be used as the switch region 3a, thus differentiating the switch region 3a from the other region 3b. In an example of the automatic ticket vender, the switch region 3a is for selection of destinations or fares. The switch-region defining circuit 11 constitutes the switch-region defining means.

The coincidence detecting circuit 12 compares the switch region 3a of the touch panel 3 defined by the switch-region defining circuit 11 with an operated position detected by the operated-position detecting circuit 10 so as to output a coincidence detection signal CS when the operated position coincides with the switch region 3a of the touch panel 3, or when the operated place partially or completely overlaps with the switch region 3a of the touch panel 3. In short, if any part of the switch region 3a used as the switch of the touch panel 3 is touched by way of a finger or the like, the coincidence detecting circuit 12 outputs the coincidence detection signal CS.

The press detection signal SS from the press detection switch 6 is applied to one input terminal of the AND circuit 13 whereas the coincidence detection signal CS from the coincidence detecting circuit 12 is applied to the other input terminal of the AND circuit 13. With both the coincidence detection signal CS from the coincidence detecting circuit 12 and the press detection signal SS from the press detection switch 6 inputted, the AND circuit 13 outputs an AND signal AS (e.g., a signal at a logical value of "1").

The operated-position signal PS outputted from the operated-position detecting circuit 10 is not supplied to a subsequent external device via the external output terminal (not shown in FIG. 2). Disposed between the operated-position detecting circuit 10 and the external output terminal is the gate circuit 14, which is opened in response to the AND signal AS supplied from the AND circuit 13 whereby the flow of the operated-position signal PS to the external output terminal is permitted. Thus, the operated-position signal PS is outputted to the external device via the gate circuit 14. In a state where the gate circuit 14 is supplied with no AND signal AS from the AND circuit 13, the gate circuit 14 is closed so that the flow of the operated-position signal PS to the external output terminal is inhibited.

That is, the gate circuit 14 normally inhibits the passage of the operated-position signal PS from the operated-position detecting circuit 10 but permits the passage of the operated-position signal PS upon receipt of the AND signal AS from the AND circuit 13. More specifically, the gate circuit 14 is composed of a kind of AND gate which, upon receipt of both the operated-position signal PS from the operated-position detecting circuit 10 and the AND signal AS from the AND circuit 13, permits the operated-position signal PS to pass therethrough and to be outputted to the subsequent external device via the external output terminal. Thus, the AND circuit 13 and the gate circuit 14 in combination constitute the output control means.

The driving-signal generating circuit 8 responds to the AND signal AS from the AND circuit 13 to generate a driving signal DS and then outputs the driving signal DS to the driving portion 5. The driving portion 5, in turn, drives the touch panel 3 into displacement.

Incidentally, the operated-position detecting circuit 10, switch-region defining circuit 11, coincidence detecting circuit 12, AND circuit 13 and gate circuit 14, or with the driving-signal generating circuit 8 further added depending upon a case, may collectively be embodied by a microcomputer.

Now, description will be made on the operation of this display unit with touch panel. When the operator touches the touch panel 3 with his finger, the touch panel 3 supplies the operated-position detecting circuit 10 with component positional signals XS and YS corresponding to a position touched by the finger or an operated place, regardless of whether the touched position is in the switch region 3a or in the other region 3b.

The operated-position detecting circuit 10, in turn, detects (analyzes) the operated position and supplies the coincidence detecting circuit 12 and the gate circuit 14 with an operated-position signal PS indicative of the operated position. In this state, however, the gate circuit 14 inhibits the flow of the operated-position signal PS to the external output terminal, thus disabling the output of the operated-position signal PS to the external device.

Accordingly, the operated-position signal PS is not outputted to the external device when the operator merely traces switches on the touch panel 3 or accidentally touches the panel 3.

When the operator presses the switch region 3a on the touch panel 3 at a pressure greater than the predetermined level Pt, the coincidence detecting circuit 12 outputs a coincidence detection signal CS while the press detection switch 6 outputs a press detection signal SS so that both the signals CS and SS are applied to the AND circuit 13. Thus, the AND circuit 13 outputs an AND signal AS.

On the other hand, the gate circuit 14 is already supplied with the operated-position signal PS by the operated-position detecting circuit 10. Therefore, with a further input of the AND signal AS from the AND circuit 13, the gate circuit 14 is opened to permit the operated-position signal PS to pass therethrough and to reach the external output terminal.

This display unit with touch panel is arranged such that the gate circuit 14 does not output the operated-position signal PS when the operator merely traces switches on the touch panel 3 or accidentally touches the touch panel. Therefore, the occurrence of operation errors caused by the operator tracing switches on the touch panel 3 or accidentally touching the touch panel 3. Accordingly, the display unit with touch panel offers a great advantage in cases, for example, where the display unit with touch panel is used under low light conditions or operated by persons with visual handicap or with weak eyes.

On the other hand, the driving-signal generating circuit 8 responds to the AND signal AS from the AND circuit 13 to generate a driving signal DS, which is supplied to the driving portion 5 whereby the driving portion 5 mechanically drives the touch panel 3. The AND signal AS from the AND circuit 13 is not supplied to the driving-signal generating circuit 8 when the operator merely traces switches on the touch panel 3 or accidentally touches it. Therefore, the driving signal DS is not generated by the driving-signal generating circuit 8 nor the driving portion 5 is actuated and hence, no tactile feedback is given to the operator of the touch panel 3.

Only after the operator presses the touch panel 3 at a pressure greater than the predetermined level Pt, the press detection signal SS is applied to the AND circuit 13 which, in turn, applies the AND signal AS to the driving-signal generating circuit 8, which, in turn, generates the driving signal DS for actuation of the driving portion 5 such that the touch panel 3 is mechanically driven to provide the operator with the tactile feedback. Thus, the operator is fed back with a positive, tactile response to the pressing of the touch panel 3. That is, the operator can feel certain of the operation of the switch by virtue of the positive tactile touch.

Specific examples of the tactile feedback given in such a case are described in the foregoing.

The operated-position signal PS passing through the gate circuit 14 and outputted to the external device indicates a position of an operated switch region among the switch regions 3a on the touch panel 3. How to use the operated-position signal PS outputted from the gate circuit 14 is optional. For example, the signal may be subject to a processing indicated by the operated switch region 3a (issuing a ticket by way of an example of the ticket vender) or otherwise, the signal may be used to cause the display body 2 to show a content represented by the operated switch portion 3a (displaying a destination or fare by way of the example of the ticket vender).

Figure 3:
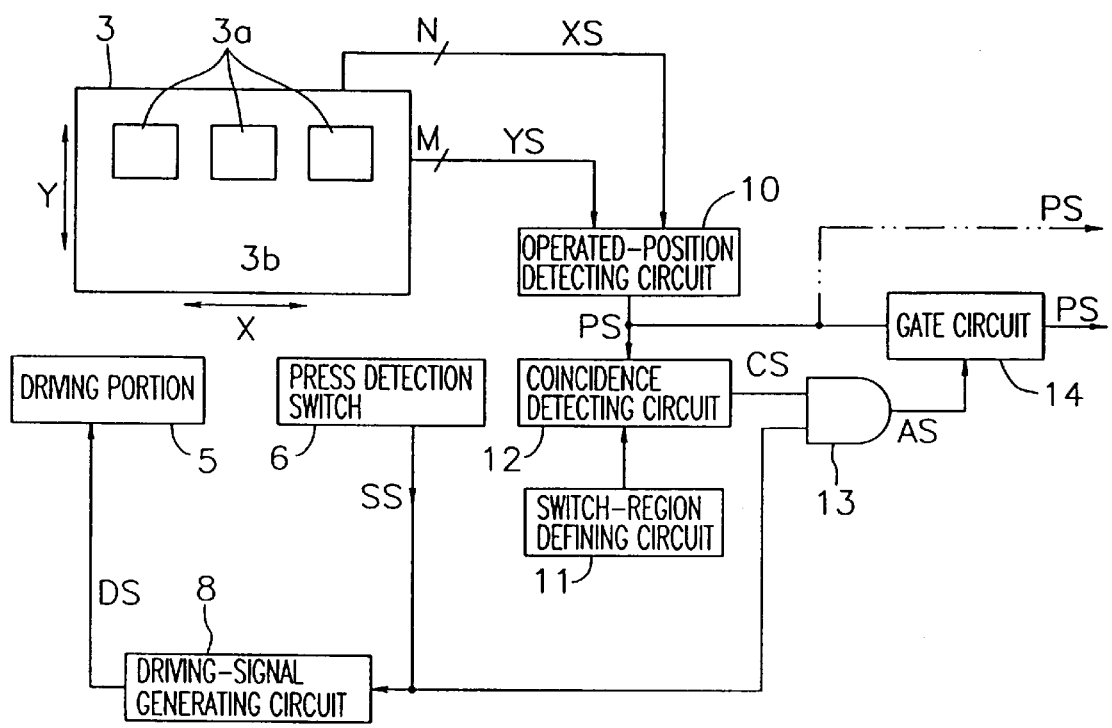
FIG. 3 is a block diagram showing an electric circuit in accordance with a second embodiment of the invention.

FIG. 3 illustrates a second embodiment of the invention. As to this embodiment, description will essentially focus on differences from the aforementioned first embodiment of the invention.

In this embodiment, as shown in FIG. 3, a press detection signal SS from the press detection switch 6 is supplied to the coincidence detecting circuit 12 and the driving-signal generating circuit 8. The driving-signal generating circuit 8 responds to input of the press detection signal SS to generate the driving signal DS.

According to this arrangement, the operator's press on a switch region 3a of the touch panel 3 at a pressure greater than the predetermined level Pt causes the press detection switch 6 to output the press detection signal SS. If, at this time, the coincidence detection signal CS is outputted from the coincidence detecting circuit 12, both the coincidence detection signal CS and the press detection signal SS are applied to the AND circuit 13 so that the AND signal AS is outputted from the AND circuit 13.

Similarly to the first embodiment, the second embodiment is also adapted such that the AND signal AS from the AND circuit 13 is applied to the gate circuit 14 thereby opening the gate circuit 14 for effecting the flow of the operated-position signal PS from the operated-position detecting circuit 10 through the gate circuit 14 to the external output terminal. At the same time, the press detection signal SS supplied from the press detection switch 6 to the driving-signal generating circuit 8 causes the driving-signal generating circuit 8 to generate the driving signal DS. The input of the driving signal DS actuates the driving portion 5 to drive the touch panel 3 into displacement whereby the operator is provided with the tactile feedback. Thus, the operator can feel certain of the operation of the touch panel by virtue of the positive tactile touch.

In a case where the operator presses the other region 3b than the switch region 3a at a pressure greater than the predetermined level Pt, as well, the press detection switch 6 outputs the press detection signal SS and therefore, the press detection signal SS is applied to the driving-signal generating circuit 8 to effect the generation of the driving signal DS. The driving signal DS actuates the driving portion 5 thereby to mechanically drive the touch panel 3. However, since the coincidence detecting circuit 12 does not output the coincidence detection signal CS, no AND signal AS is outputted from the AND circuit 13 so that the gate circuit 14 remains closed. This inhibits the passage of the operated-position signal PS from the operated-position detecting circuit 10 through the gate circuit 14. Consequently, the operated-position signal PS cannot reach the external output terminal.

Figure 4:
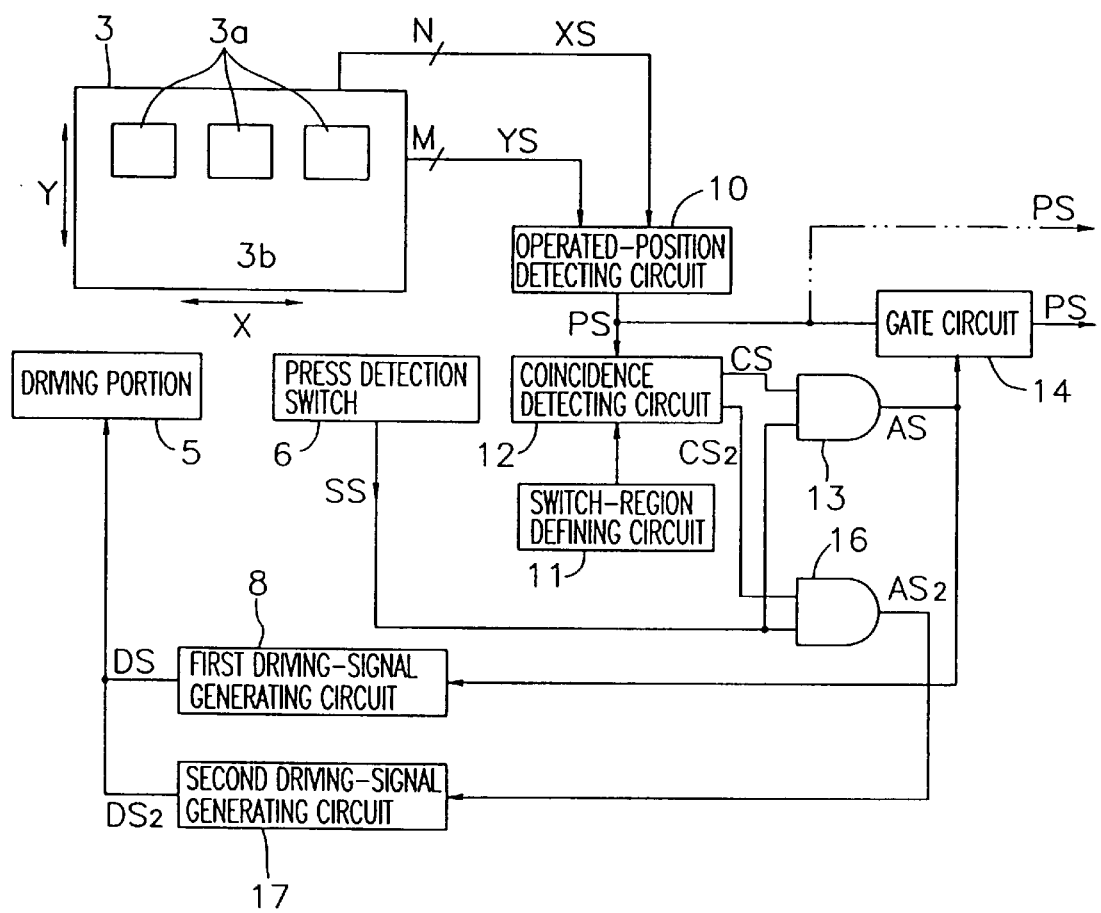
FIG. 4 is a block diagram showing an electric circuit in accordance with a third embodiment of the invention.

FIG. 4 illustrates a third embodiment of the invention. As to this embodiment, description will essentially focus on differences from the first embodiment.

In this embodiment, as shown in FIG. 4, the coincidence detection circuit 12 outputs an anticoincidence detection signal $CS_2$, additionally to the aforesaid coincidence detection signal CS, when a switch region 3a of the touch panel 3, which is defined by the switch-region defining circuit 11, does not coincide with the operated-position signal PS detected by the operated-position detecting circuit 10. In short, if the operator operates the other region 3b than the switch region 3a of the touch panel 3 by way of his finger or the like, the coincidence detecting circuit 12 outputs the anticoincidence detection signal $CS_2$.

The anticoincidence detection signal $CS_2$ and the coincidence detection signal CS are selectively outputted from the coincidence detecting circuit 12 so that both the signals are not outputted simultaneously. As described in the foregoing, the coincidence detection signal CS is applied to the AND circuit 13.

Understandably, there is no problem if the coincidence detecting circuit 12 intended only for the output of the coincidence detection signal CS is provided with a NOT circuit at its output side, the NOT circuit adapted to output a signal inverted from the coincidence detection signal CS or to generate the anticoincidence signal $CS_2$. In this case, the NOT circuit and the coincidence detecting circuit 12 in combination constitute the coincidence detecting means.

In this embodiment, the aforesaid AND circuit 13 and driving-signal generating circuit 8 are referred to as "a first AND circuit 13" and "a first driving-signal generating circuit 8" and there are further provided a second AND circuit 16 and a second driving-signal generating circuit 17.

The aforesaid anticoincidence signal $CS_2$ from the coincidence detecting circuit 12 and the press detection signal SS from the press detection switch 6 are supplied to the second AND circuit 16. Where the AND signal AS outputted from the first AND circuit 13 is referred to as "a first AND signal", the second AND circuit 16 outputs a second AND signal $AS_2$ (e.g., a signal at a logical value of "1") on condition that both the anticoincidence signal $CS_2$ and the press detection signal SS are applied thereto.

The second AND signal $AS_2$ is supplied to the second driving-signal generating circuit 17. Where the driving signal DS outputted from the first driving-signal generating circuit 8 is referred to as "a first driving signal DS", the second driving-signal generating circuit 17 responds to the second AND signal $AS_2$ to generate a second driving signal $DS_2$ of a different characteristic from that of the first driving signal DS. Similarly to the first driving signal DS, the second driving signal $DS_2$ is supplied to the driving portion 5. The differences in the characteristics of the first and second driving signals DS and $DS_2$ may be made based on the kind of signals (DC, AC, or pulse), the amplitude, the frequency and the like.

Since the driving portion 5 receives the first driving signal DS from the first driving-signal generating circuit 8 and the second driving signal $DS_2$ from the second driving-signal generating circuit 17 which signals differ from each other in the characteristic, the driving portion 5 drives the touch panel 3 into displacement in different fashions depending upon which of the signals is inputted.

Thus, the use of the first and second driving signals DS and $DS_2$ applied to the driving portion 5 allows the operator to be fed back with two different tactile responses to the pressing of the touch panel 3.

More specifically, if an arrangement is made such that the first driving-signal generating circuit 8 outputs a pulse signal as the first driving signal DS whereas the second driving-signal generating circuit 17 outputs a low-frequency AC signal as the second driving signal $DS_2$, the operator may fed back with a "click" touch as the first tactile response to the pressing of the switch region 3a of the touch panel 3 as well as with a vibration, different from the above click touch, as the second tactile response to the pressing of the other region 3b than the switch region 3a.

This embodiment is adapted to provide different tactile responses depending upon whether the operator presses the switch region 3a or the other region 3b than the switch region 3a of the touch panel 3. Accordingly, the operator is not only fed back with a positive tactile response to the pressing of the switch portion 3a of the touch panel 3 but is also allowed to discern between the pressing of the switch region 3a and the pressing of the other region 3b of the touch panel 3 based on the difference in the touches thus fed back.

Accordingly, the use of two different types of tactile feedbacks to the operator allows the operator to get more specific responses to the operation of the touch panel 3 than the case where only one type of tactile feedback is given to the operator. At the same time, the reliability of the operation performed by the operator is further improved. This results in an even greater advantage in cases where the display unit with touch panel is used under low light conditions or operated by persons with visual handicap or with weak eyes.

As to which of the two different tactile feedbacks represents the pressing of the switch region 3a of the touch panel 3, a tactile feedback more resemblent to the click touch may be associated with the pressing of the switch region 3a of the touch panel 3, for example. Otherwise, the stronger tactile feedback may be associated with the pressing of the switch region 3a than the pressing of the other region 3b. In addition, as the operator becomes more accustomed to both types of tactile feedbacks, the operator will be able to distinguish one feedback from the other fairly well.

Alternatively, the driving portion 5 may include a first driving portion for providing a first tactile feedback by driving the touch panel 3 into displacement based on the first driving signal DS from the first driving-signal generating circuit 8 and a second driving portion for providing a second tactile feedback different from the firs feedback by driving the touch panel 3 into displacement based on the second driving signal $DS_2$ from the second driving-signal generating circuit 17. This provides more diversified tactile feedbacks to the operator more easily.

Now, a fourth embodiment of the invention will be described.

As shown by a two-dot chain line in FIGS. 2 to 4, respectively, this embodiment further includes another external output terminal (not shown) for bypassing the gate circuit 14 thereby outputting the operated-position signal PS from the operated-position detecting circuit 10 directly to the external device. Thus is established another signal route additionally to the route by way of the gate circuit 14.

The operated-position signal PS directly applied to the external device is also outputted when switches of the touch panel 3 are traced. Accordingly, such a signal may be utilized for showing information on what switches were traced by ay of sound, voice, the display screen of the display body 2 and the like. In a case where some switch regions 3a of the touch panel 3 are traced, for example, information indicative of the traced switch regions 3a (destinations or fares by way of the example of the ticket vender) may be displayed by way of sound, voice, he display screen or the like. In a case where a finger or the like on the switch region 3a is slid into the other region 3b of the touch panel 3, the subsequent external device may be utilized to inform by way of sound, voice, the display screen or the like that the touch panel 3 was manipulated at the other region 3b than the switch region 3a. This offers a great advantage to persons with visual or hearing handicap.

Figure 5:
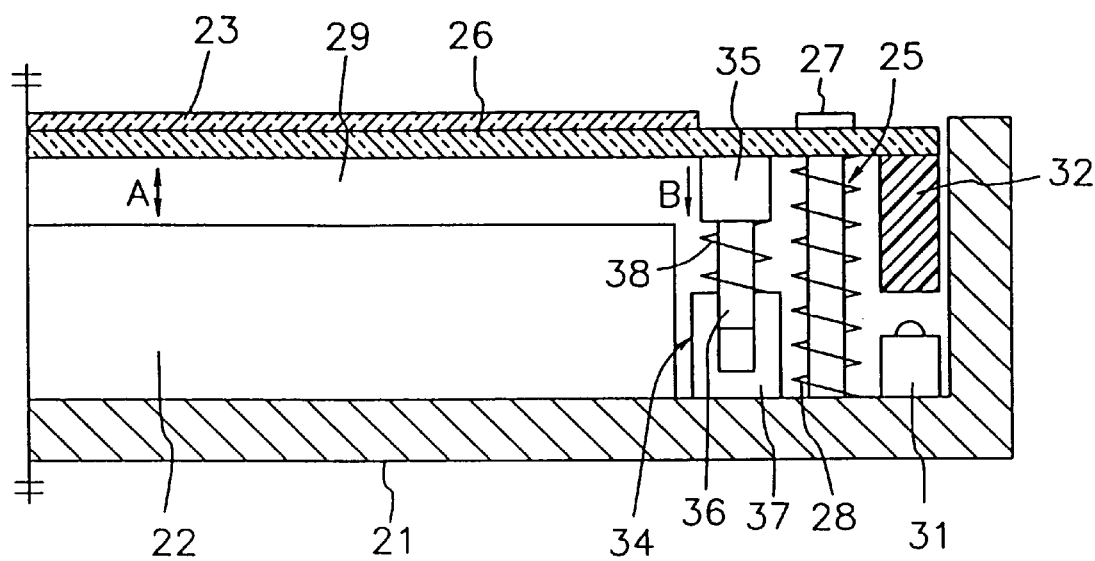
FIG. 5 is a sectional view showing a fifth embodiment of the invention.
Figure 6:
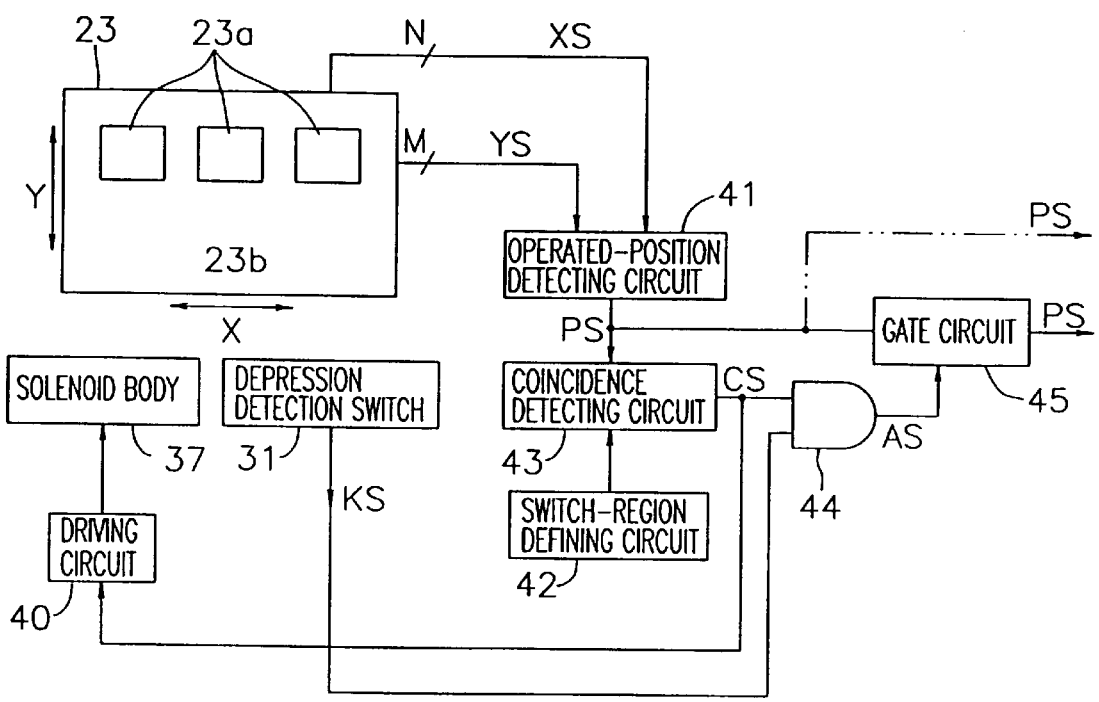
FIG. 6 is a block diagram showing an electric circuit in accordance with the fifth embodiment of the invention.

FIGS. 5 and 6 illustrate a fifth embodiment of the invention. FIG. 5 is a sectional view showing a display unit with touch panel according to the invention. Since the display unit has a symmetrical construction, the left half portion thereof is omitted in the figure. FIG. 6 diagrammatically illustrates one example of the electric circuit of the display unit with touch panel according to the invention. The following description will essentially focus on differences from the first embodiment hereof.

As seen in FIG. 5, the display unit with touch panel of this embodiment includes a case 21 such as formed of metal, a display body 22 accommodated in the case, and a touch panel 23 dispose above and close to the display body.

The display body 22 has a similar construction to that of the display body 2. Where the display body 22 is formed of a very thin material such as paper, a sheet or the like, the display body 22 may be attached to the back surface of the touch panel 23 so as to be vertically moved together with the touch panel 23.

The touch panel 23 is constructed in a similar manner to the touch panel 3 and adapted to output the aforementioned component positional signals XS and YS for two-dimensional expression of an operated position.

The touch panel 23 is retained by a touch-panel retaining mechanism 25 allowing the panel to be depressed at a predetermined stroke, as shown by an arrow A in FIG. 5. The touch-panel retaining mechanism 25 includes a transparent or translucent touch-panel support plate 26 supporting the touch panel 23 and formed of, for example, a resin material, plural support columns 27 for vertically movably supporting the touch-panel support plate 26, and a spring 28 (e.g., helical compression spring) wound around each support column 27 for resiliently urging upward the touch panel 23 and the touch-panel support plate 26.

A gap 29 is defined between the touch-panel support plate 26 and the display body 22 for allowing a depression stroke of the touch panel 23. A depression stroke of 0.5 mm to 1 mm at least, for example, can provide an adequate stroke touch. The resilient force of the spring 28 is selected such that the touch panel 23 and the touch-panel support plate 26 may be urged back to their original places. That is, the spring 28 need not have a great resilient force such that the touch panel 23 and the like may readily be depressed against this resilient force of the spring 28.

It is to be noted that the touch-panel support plate 26 is intended for the reinforcement of the touch panel 23 and constructed in a similar manner to the touch panel 3.

The case 21 contains therein a depression detection switch 31 responsive to the depression of the touch panel 23 thereby to output a depression detection signal KS (see FIG. 6). The depression detection switch 31 constitutes the press detecting means while the depression detection signal KS from the depression detection switch 31 is equivalent to the press detection signal.

The depression detection switch 31 may be disposed at one place or more than one places on a periphery of the touch panel 23. Upon depression of the touch panel 23 by the operator, the depression detection switch 31 is turned on as pressed by an operator piece 32 and outputs the depression detection signal KS. The operator piece 32 is formed of, for example, a resin material and attached to a lower sur ace of the touch-panel support plate 26 at an end portion thereof. The depression detection switch 31 may employ either of the contact type switch such as a contact switch and the non-contact type switch such as a photoelectric switch.

The case 21 further contains therein a lock mechanism 34, which serves to inhibit a depression of the touch panel 3. The lock mechanism 34 is adapted to cancel this inhibition in response to the coincidence signal from the coincidence detecting circuit which will be described later. The lock mechanism 34 may be provided at one place but is more preferable provided at multiple places on the periphery of the touch panel 23 for locking the touch panel 23 in a balanced position.

The lock mechanism 34 is composed of a solenoid body 37 for drawing a plunger 36 combined with a support 35 in a direction of an arrow B in FIG. 5, and a spring 38 (e.g., helical compression spring) for resiliently urging the plunger 36 and the like in the opposite direction to the arrow B. The support 35 is simply abutted against the lower surface of the touch-panel support plate 26. The resilient force of the spring 38 is defined such that a normal pressing force of the operator can hardly accomplish the depression of the touch panel 23 and the touch-panel support plate 26 against this resilient force. The resilient force of the spring 38 and the force of the solenoid body 37 for drawing the plunger 36 and the like are defined such that when energized, the solenoid body 37 is capable of drawing the plunger 36 and the like against the resilient force of the spring 38.

Referring to FIG. 6, description will be made on the electric circuit of this display unit with touch panel, which is constructed substantially the same manner as the first embodiment hereof. The circuit includes the depression detection switch 31, a driving circuit 40, an operated-position detecting circuit 41, a switch-region defining circuit 42, a coincidence detecting circuit 43, an AND circuit 44, a gate circuit 45 and the like.

The operated-position detecting circuit 41 is structured the same manner as the aforesaid operated-position detecting circuit 10. Based on the component positional signals XS and YS supplied from the touch panel 23, the circuit 41 detects coordinates (Xn, Ym) of a position at which the operator has operated the touch panel 23 and then, outputs the operated-position signal PS indicative of the operated position. The operated-position signal PS is applied to the gate circuit 45 as well as to the coincidence detecting circuit 43.

Similarly to the aforesaid switch-region defining circuit 11, the switch-region defining circuit 42 has a function to determine one or more switch regions 23a practically used as switch in the touch panel 23. The circuit 42 determines what portion of all the touchable area of the touch panel 23 to be used as the switch region 23a, thus differentiating the switch region from the other region 23b.

Similarly to the aforesaid coincidence detecting circuit 12, the coincidence detecting circuit 43 compares the switch region 23a defined by the switch-region defining circuit 42 with the operated position detected by the operated-position detecting circuit 41 so as to output a coincidence detection signal CS when the operated position coincides with the switch region 23a of the touch panel 23 or the operated place partially or completely overlaps with the switch region 23a.

The depression detection signal KS from the depression detection switch 31 is applied to one input terminal of the AND circuit 44 whereas applied to the other input terminal of the AND circuit 44 is the coincidence detection signal CS from the coincidence detecting circuit 43. With input of both the coincidence detection signal CS from the coincidence detecting circuit 43 and the depression detection signal KS from the depression detecting circuit 31, the AND circuit 44 outputs an AND signal AS (e.g., a signal at a logical value of "1").

Similarly to the aforesaid gate circuit 14, the gate circuit 45 is disposed between the operated-position detecting circuit 41 and an external output terminal not shown in FIG. 6. Upon receipt of the AND signal AS from the AND circuit 44, the gate circuit 45 opens to permit a flow of the operated-position signal PS to the external output terminal and thus, the signal PS is supplied to the subsequent external device via the gate circuit 45. In a state where no AND signal AS is applied to the gate circuit 45, the gate circuit 45 is closed, thus inhibiting the flow of the operated-position signal PS to the external output terminal. Like the aforementioned gate circuit 14, this gate circuit 45 is composed of a kind of AND gate. The AND circuit 44 and the gate circuit 45 in combination constitute the output control means.

The driving circuit 40 is supplied with the coincidence detection signal CS from the coincidence detecting circuit 43 and amplifies the inputted coincidence detection signal CS so as to apply the resultant signal to the solenoid body 37 of the lock mechanism 34. The solenoid body 37 is actuated (energized) by this output from the driving circuit 40 thereby to draw in the plunger 36 and the like against the resilient force of the spring 38. Where the coincidence detection signal CS has a sufficient power for actuating the solenoid body 37, the driving circuit 40 is not required.

Similarly to the aforesaid first embodiment hereof, the operated-position detecting circuit 41, switch-region defining circuit 42, coincidence detecting circuit 43, AND circuit 44 and gate circuit 45, or with the driving circuit 40 further added depending upon a case, may collectively be embodied by a microcomputer.

As to the operation of the display unit with touch panel of this embodiment, this display unit basically operates in the same manner as that of the first embodiment but has a main difference therefrom in the following point.

When the operator touches the switch region 23a of the touch panel 23, the coincidence detection signal CS from the coincidence detecting circuit 43 is applied to the driving circuit 40 which, in turn, amplifies the coincidence detection signal CS for actuation of the solenoid body 37. That is, the lock mechanism 34 operates to draw in the plunger 36 for cancellation of a locked state of the touch panel 23.

Thus, the touch panel 23 and the touch-panel support plate 26 are retained by only a moderate resilient force of the spring 28 of the touch-panel retaining mechanism 25 and therefore, the operator is allowed to depress the touch panel 23 at the predetermined stroke. That is, the operator depresses the touch panel 23 and the touch-panel support plate 26 against the resilient force of the spring 28 at the predetermined stroke, while a resistance of the spring 28 against this depression provides the operator with a tactile stroke touch. As a result, the operator is fed back with quite an obvious tactile response to the operation of the switch.

Simultaneously with the depression of the touch panel 23, the depression detection switch 31 is turned on to output the depression detection signal KS. On the other hand, the AND circuit 44 receives both the coincidence detection signal CS from the coincidence detecting circuit 43 and the depression detection signal KS from the depression detection switch 31 thereby to output the AND signal AS.

At this time, the gate circuit 45 has already received the operated-position signal PS from the operated-position detecting circuit 41 so that with an additional input of the AND signal AS from the AND circuit 44, the gate circuit 45 opens to permit the operated position signal PS to pass therethrough to reach the external output terminal.

Upon release of the finger or the like of the operator from the touch panel 23, the output of the component positional signals XS and YS from the touch panel 23 is stopped, followed by the stopped output of the coincidence detection signal CS and the operated-position detection signal PS as well as the stopped energization of the solenoid body 37 of the lock mechanism 34. Hence, the resilient force of the spring 28 of the touch-panel retaining mechanism 25 combined with the resilient force of the spring 38 of the lock mechanism 34 act to return the touch panel 23 and the touch-panel support plate 26 to their original places. By virtue of both resilient forces, the touch panel 23 and the touch-panel support plate 26 can accomplish quick return.

In case the operator slides his finger depressing the touch panel 23 beyond the switch region 23a into the other region 23b, there may be added a circuit for inhibiting the cancellation of energization of the solenoid body 37 of the lock mechanism 34. This prevents the locked touch panel 23 from being accidentally released to rise during he tracing of switches on the panel, whereby the operator is prevented from being upset.

When the operator merely traces switch regions 23a on the touch panel 23 or accidentally touches it, the operated-position signal PS is not supplied to the external device. Nor, the signal PS is not supplied to the external device unless the operator further depresses the touch panel 23.

This assures the prevention of operation errors caused by the operator tracing switches on the touch panel or accidentally touching the panel, thus offering a great advantage in cases, for example, where the display unit with touch panel is used under low light conditions or operated by persons with visual handicap or with weak eyes.

The display unit with touch panel of this embodiment provides not only a tactile "stroke" touch in the aforementioned manner but also a tactile "click" touch in response to an instantaneous depression of the switch region 23a of the touch panel 23 because at the instant of depressing the touch panel, the touch panel locked by the lock mechanism 34 is released, resulting in sudden drop in the force required for depressing the touch panel. Hence, the operator is fed back with quite an obvious tactile response to the operation of the switch.

Figure 7:
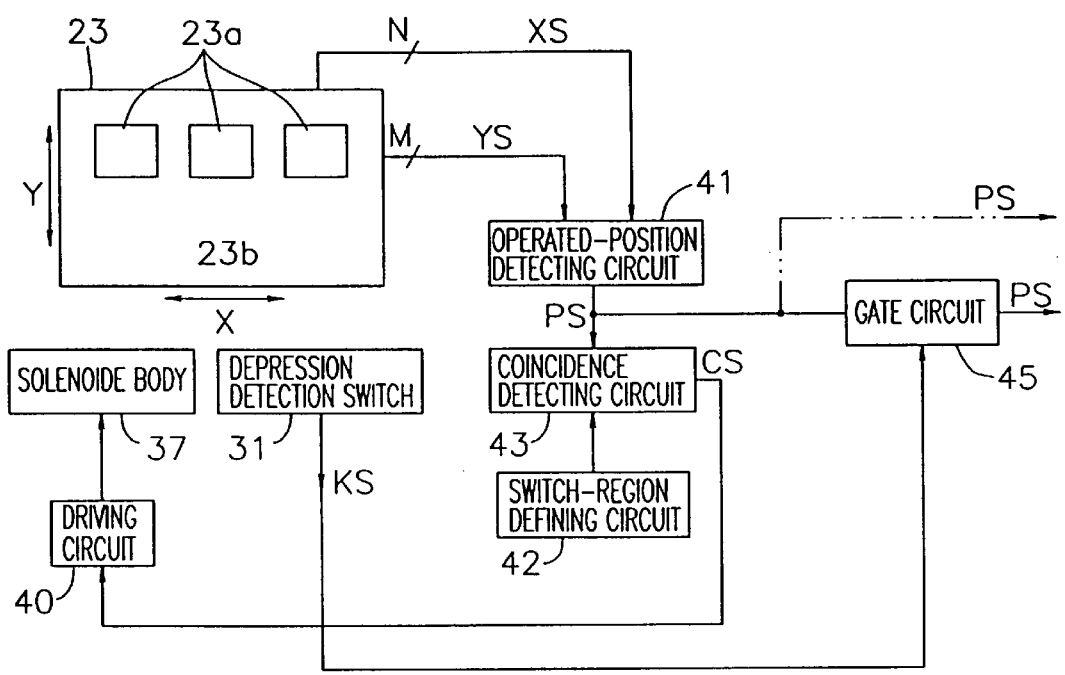
FIG. 7 is a block diagram showing an electric circuit in accordance with a sixth embodiment of the invention.

FIG. 7 illustrate a sixth embodiment of the invention. As to this embodiment, description will essentially focus on differences from the aforementioned fifth embodiment hereof.

As seen in FIG. 7, this embodiment eliminates the AND circuit 45 and is adapted such that the depression detection signal KS from he depression detection switch 31 is directly applied to the gate circuit 45 for opening the gate circuit 45 hereby the passage of the operated-position signal PS through the gate circuit 45 is permitted. In this case, the depression detection signal KS from the depression detection switch 31 is used as a control signal for controlling the passage of the operated-position signal PS through the gate circuit 45 and hence, by virtue of substantially the same effect as that of the fifth embodiment, the occurrence of operation errors caused by the tracing of switches on the touch panel or the like can be prevented. Additionally, the structure of the electric circuit is the more simplified by the elimination of the AND circuit 44.

According to FIG. 7, although the coincidence detection signal CS is not outputted from the coincidence detecting circuit 43 as a factor of the AND condition to open the gate circuit 45, the coincidence detection signal CS is outputted from the coincidence detecting circuit 43 when the operator operates the switch region 23a of the touch panel 23. That is, the coincidence detection signal CS cancels the lock of the lock mechanism 34 to cause the depression detection switch 31 to output the depression detection signal KS. The gate circuit 45 is opened upon receipt of the depression detection signal KS. In other words, the output of the coincidence signal CS leads to the output of the depression detection signal KS, the input of which causes the gate circuit 45 to open. Thus, the AND condition is established by both the signals CS and KS in practical terms.

On the other and, if the operator forcibly depresses the touch panel 23 at the other region 23b than the switch region 23a, the gate circuit 45 is opened in response to the depression detection signal KS from the depression detection switch 31 although the coincidence detection signal CS is not outputted from the coincidence detecting circuit 43. As a result, the operated-position signal PS is supplied to the external device. Such a depression of the touch panel 23 is a so-called anomalous operation opposing the function of the lock mechanism 34. At this time, the operated-position signal PS indicative of the depression of the other region 23b than the switch region 23a on the touch panel 23 is also supplied to the external device.

Even in this case, it is possible for the external device to determine whether this operated-position signal PS indicates the repression of the switch region 23a on the touch panel 23 or the depression of the other region 23b. This is because the operated-position signal PS indicates a position at which the operator actually has operated the touch panel 23. On the other hand, the provision of the AND circuit 44 like the fifth embodiment hereof leads to an advantage of a simple single processing performed by the subsequent external device and a simplified structure of the circuit for the signal processing because the gate circuit 45 outputs the operated-position signal PS only when the switch region 23a of the touch panel 23 is depressed.

Next, a seventh embodiment of the invention will be described. As shown by a two-dot chain line in FIGS. 6 and 7, respectively, this embodiment further includes another external output terminal (not shown) for bypassing the gate circuit 14 thereby outputting the operated-position signal PS from the operated-position detecting circuit 41 directly to the external device. Thus is established another signal route additionally to the route by way of the gate circuit 45.

Since the operated-position signal PS directly supplied to the external device is also outputted when the switches on the touch panel 3 are traced, such a signal may be utilized for showing information on the tracing of switches by way of sound, voice, the display screen of the display body 22 or the like. In a case where some switch regions 3a of the touch panel 3 are traced, for example, information indicative of contents assigned to the traced switch regions 3a (destinations or fares by way of the example of the ticket vender) may be given by way of voice, sound, the display screen or the like. When a finger or the like on the touch panel 3 is slid into the other region 23b, the subsequent external device may be utilized to inform by way of sound, voice, the display screen or the like that the operated position is not in the switch region 23a of the touch panel 23. This offers a great convenience to persons with visual or hearing handicap.

Figure 8:
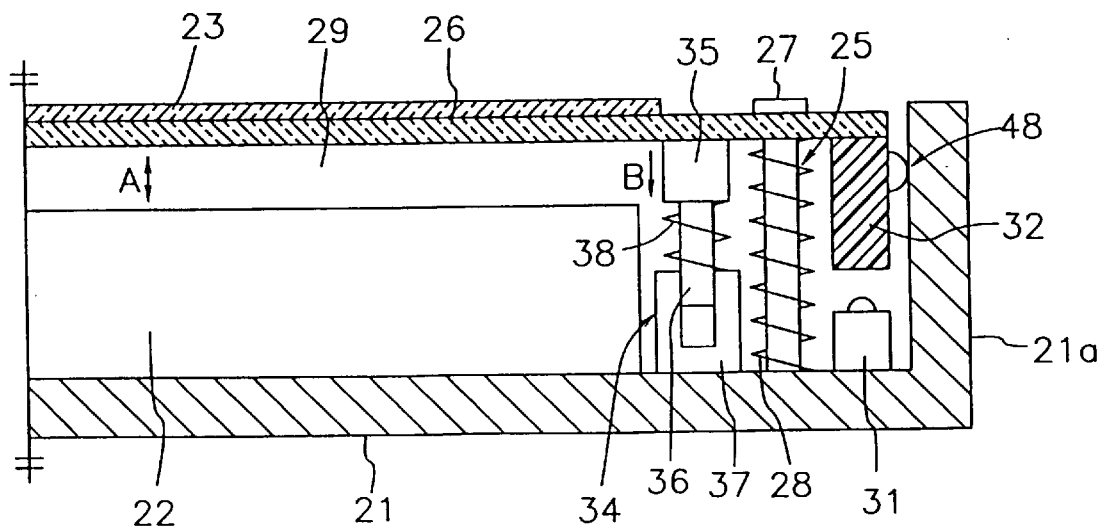
FIG. 8 is a sectional view partially showing an eighth embodiment of the invention.
Figure 9:
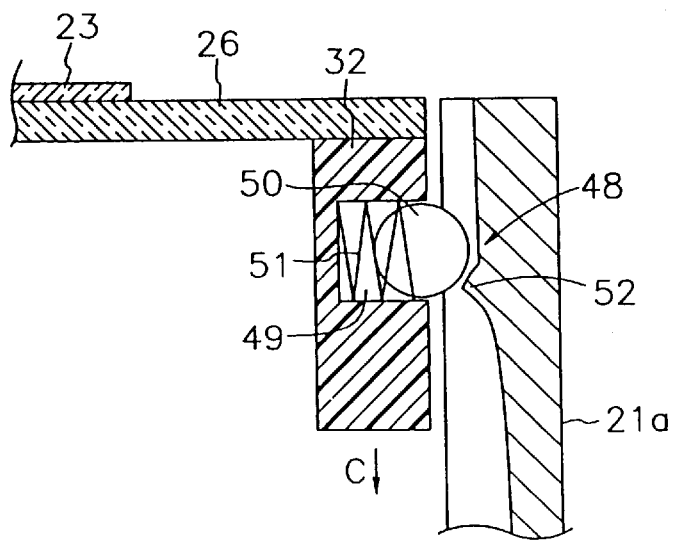
FIG. 9 is a sectional view partially showing the eighth embodiment of the invention.

FIGS. 8 and 9 illustrate an eighth embodiment of the invention. Although the aforementioned fifth embodiment is adapted to provide the tactile "click" touch to a degree, this embodiment further includes a click-touch generating mechanism 48, as shown in FIGS. 8 and 9, in order to further enhance the tactile "click" touch.

Now referring to FIG. 9, the click-touch generating mechanism 48 includes a ball 50 received by a recess 49 formed in a side surface of the aforesaid operator piece 32, a spring 51 (e.g., helical compression spring) serving to resiliently pushing the ball outward, and a projection 52 formed on an inner surface of a side wall 21a of the case 21 in opposed relation to the operator piece 32.

The ball 50 normally rests on the projection 52. In order to depress the touch panel 23 in a direction shown by an arrow C in FIG. 9, a relatively great force is initially required or sliding the ball 50 over the projection 52 but the resistance to the depression of the panel suddenly decreases once the ball 50 goes beyond the projection 52, where by a positive tactile click touch is fed back. It is to be noted that the click-touch generating mechanism 48 may be embodied by other structures than the above.

Figure 10:
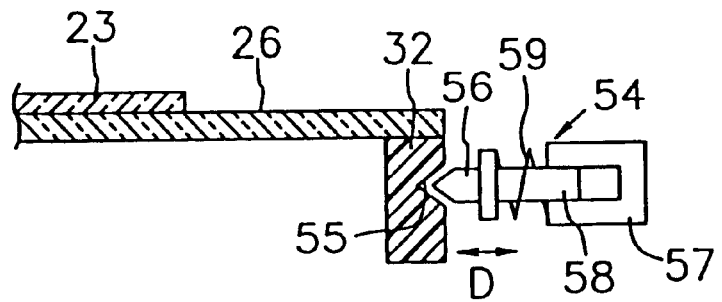
FIG. 10 is a sectional view partially showing a ninth embodiment of the invention.
Figure 11:
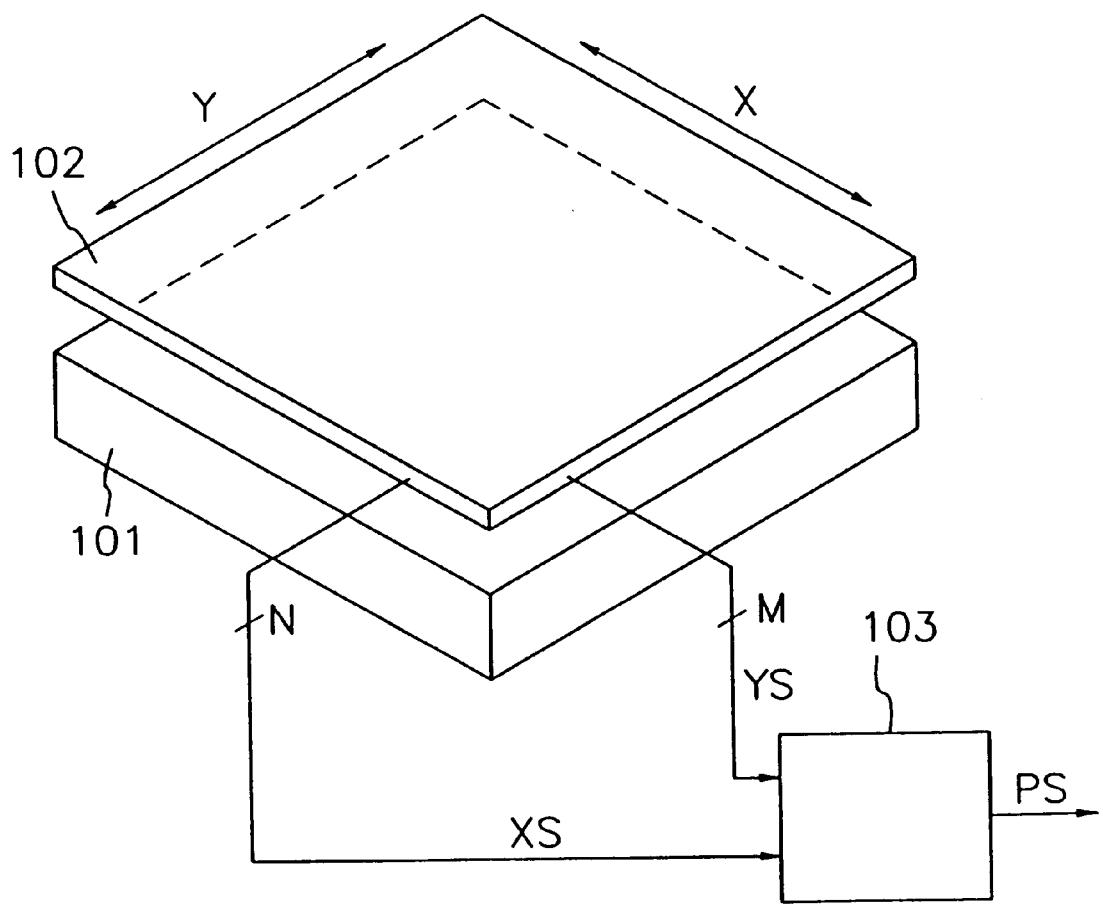
FIG. 11 is a block diagram showing an exemplary electric circuit of a unit of the background art of the invention.

FIG. 10 illustrates a ninth embodiment of the invention. This embodiment is another example of the lock mechanism for preventing the depression of the touch panel 23 and has a structure to move horizontally.

Specifically, a lock mechanism 54 of this embodiment includes an engagement hole 55 formed in a side surface of the operator piece 32, an engaging projection 56 to be received by the engagement hole 55 for engagement therewith, and a similar group of a solenoid body 57, plunger 58 and spring 59 to that of the solenoid body 37, plunger 36 and spring 38, the group operating to horizontally reciprocating the engaging projection 56 as shown by an arrow D in FIG. 10.

In a state where the solenoid body 57 is not energized, the engaging projection 56 is pushed in the engagement hole 55 by the resilient force of the spring 59 thereby establishing the engagement therebetween. In this manner, the touch panel 23 is prevented from being depressed (locked). Upon energization of the solenoid body 57, the engaging projection 56 is drawn out of the engagement hole 55 thereby canceling the engagement therebetween and thus, the locked touch panel 23 is released.

As described in the foregoing, the display unit with touch panel according to the invention offers the following effects.

When the operator merely traces switches on the touch panel, the output control means inhibits the passage of the operated-position signal whereby the operated-position signal is not supplied to the external device. Only after the operator touches and depresses the touch panel at a pressure greater than a predetermined level, the output control means permits the operated-position signal to be supplied to the external output terminal. Hence, the operated-position signal is not outputted from the output control means when the touch panel is accidentally touched or switches on the panel are merely traced.

This assures the prevention of operation errors caused by the operator merely tracing switches on the touch panel or accidentally touching the panel.

Further, the arrangement is made such that with input of both the coincidence detection signal from the coincidence detecting means and the press detection signal from the press detecting means, the AND circuit outputs the AND signal, which, in turn, causes the driving-signal generating means to generate the driving signal, which serves to actuate the driving means. Accordingly, the operator is not fed back with the tactile response, when merely tracing switches on the touch panel or accidentally touching the panel. Thus, only after the operator presses the touch panel at a pressure greater than the predetermined level, the press detection signal is outputted for providing the operator with the tactile feedback to the operation of the touch panel. The operator can feel certain of the operation of the switch by virtue of the positive tactile feedback. Furthermore, the operator is not fed back with the tactile response when pressing the other region than the switch region of the touch panel. This contributes to the creation of definite awareness in the operator that he has operated the touch panel and hence, the reliability of the operation performed by the operator is increased.

Further, an arrangement may be made such that only the press detection signal from the press detecting means causes the driving-signal generating means to generate the driving signal. In this case, the touch panel is driven based on the driving signal, but unless the coincidence detection signal is outputted from the coincidence detecting means, or unless the operator operates the switch region defined by the switch-region defining means, there occurs no output of the operated-position signal. This enhances the reliability of the switch operation performed by the operator.

Since different types of tactile responses are fed back to the operator depending upon whether the switch region of the touch panel is pressed or the other region than the switch region is pressed, the operator can feel certain of the operation of the switch by virtue of the positive tactile feedbacks. Furthermore, the operator can determine whether the switch region is pressed or the other region is pressed based on the difference in the tactile feedbacks.

Since the driving means includes the first and second driving means for providing tactile feedbacks different from each other, the tactile feedbacks can be more diversified more readily.

Additionally, since the arrangement is made such that the operated-position signal from the operated-position detecting means is directly supplied to the external device, the directly outputted operated-position signal may be utilized to show the information on what switches were traced by way of sound, voice, the display screen or the like.

Since the touch-panel retaining mechanism retains the touch panel in a manner to allow for the depression of the touch panel thereby releasing the touch panel locked by the lock mechanism when the switch region of the touch panel is operated by touching it or the like, the operator is allowed to depress the touch panel at a predetermined stroke with his finger placed on the switch region of the touch panel. This provides the operator with the tactile "stroke" touch.

The click-touch generating mechanism ensures that the operator can feel the tactile "click" touch.

What is claimed is:

1. A display unit with touch panel comprising a display body having a display screen for displaying images including characters, patterns, symbols and the like, a transparent or translucent touch panel disposed above the display screen of said display body, and operated-position detecting means for detecting a place at which an operator has touched said touch panel, said touch panel outputting at least one kind of component positional signal indicative of the place touched by the operator, said operated-position detecting means receiving said component positional signal from said touch panel for detecting said place of the touch panel touched by the operator and outputting an operated-position signal indicative of the place thus detected, the display unit with touch panel further comprising:
switch-region defining means for defining a switch region used as a switch in the overall touchable area of said touch panel;
coincidence detecting means for comparing the switch region defined by said switch-region defining means with the place detected by said operated-position detecting means so as to output a coincidence detection signal when the place detected by said operated-position detecting means overlaps with said switch region;

press detecting means for detecting a press on said touch panel when the operator touches and presses said touch panel and outputting a press detection signal;

output control means for determining whether to permit or inhibit a flow of said operated-position signal from said operated-position detecting means to an external output terminal, and permitting the flow of said operated-position signal to said external output terminal on condition that said coincidence detection signal and said press detection signal are both inputted; and tactile feedback providing means driving said touch panel into displacement to provide the operator with a tactile feedback to the press on said touch panel on condition that at least said coincidence detection signal is inputted.

2. A display unit with touch panel as claimed in claim 1, wherein said output control means comprises:

an AND circuit for outputting an AND signal upon receipt of both the coincidence detection signal from said coincidence detecting means and the press detection signal from said press detecting means, and a gate circuit interposed between said operated-position detecting means and said external output terminal, and responsive to input of said AND signal to permit the flow of said operated-position signal to said external output terminal, the display unit with touch panel further comprising:

driving-signal generating means responding to input of said AND signal from said AND circuit to generate a driving signal; and wherein said tactile feedback providing means comprises driving means responding to input of said driving signal generated by said driving-signal generating means to drive said touch panel into displacement thereby providing the operator with a tactile feedback to the press on said touch panel.

3. A display unit with touch panel as claimed in claim 1, wherein said output control means comprises:

an AND circuit for outputting an AND signal upon receipt of both the coincidence detection signal form said coincidence detecting means and the press detection signal form said press detecting means, and a gate circuit interposed between said operated-position detecting means and said external output terminal, and responsive to input of said AND signal to permit the flow of said operated-position signal to said external output terminal, the display unit with touch panel further comprising:

driving-signal generating means responding to input of said press detection signal to generate a driving signal, and wherein said tactile feedback providing means comprises driving means responding to input of said driving signal generated by said driving-signal generating means to drive said touch panel into displacement thereby providing the operator with a tactile feedback to the press on said touch panel.

4. A display unit with touch panel as claimed in claim 1, wherein said coincidence detecting means outputs an anticoincidence detection signal when the place detected by said operated-position detecting means does not overlap with said switch region, and wherein said output control means comprises:

a first AND circuit for outputting a first AND signal upon receipt of both of said coincidence detection signal and said press detection signal, a second AND circuit for outputting a second AND signal upon receipt of both of said anticoincidence detection signal and said press detection signal, and a gate circuit interposed between said operated-position detecting means and said external output terminal and responsive to input of said first AND signal to permit the flow of said operated-position detection signal to said external output terminal, the display unit with touch panel further comprising:

a first driving-signal generating means responding to input of said first AND signal to generate a first driving signal, and a second driving-signal generating means responding to input of said second AND signal to generate a second driving signal of a different characteristic from that of said first driving signal, and wherein said tactile feedback providing means comprises driving means responding to input of said first driving signal generated by said first driving-signal generating means to drive said touch panel into displacement thereby providing the operator with a tactile feedback to the press on said touch panel and responding to input of said second driving signal generated by said second driving-signal generating means to drive said touch panel into displacement thereby providing the operator with a different tactile feedback from said feedback.

5. A display unit with touch panel as claimed in claim 4, wherein said driving means further includes:

a first driving means responding to input of said first driving signal generated by said first driving-signal generating means to drive said touch panel into displacement thereby providing the operator with a first tactile feedback to the press on said touch panel; and a second driving means responding to input of said second driving signal generated by said second driving-signal generating means to drive said touch panel into displacement thereby providing the operator with a second tactile feedback to the press on said touch panel, the second tactile feedback differed from said first tactile feedback.

6. A display unit with touch panel as claimed in claim 2, further including another external output terminal for establishing a flow of said operated-position signal from said operated-position detecting means via a different route from that employed by said output control means.

7. A display unit with touch panel as claimed in claim 3, further including another external output terminal for establishing a flow of said operated-position signal from said operated-position detecting means via a different route from that employed by said output control means.

8. A display unit with touch panel as claimed in claim 4, further including another external output terminal for establishing a flow of said operated-position signal from said operated-position detecting means via a different route from that employed by said output control means.

9. A display unit with touch panel as claimed in claim 5, further including another external output terminal for establishing a flow of said operated-position signal from said operated-position detecting means via a different route from that employed by said output control means.

10. A display unit with touch panel as claimed in claim 1, further including a touch-panel retaining mechanism for retaining said touch panel in a manner to allow said touch panel to be depressed at a predetermined stroke, wherein said tactile feedback providing means comprises a lock mechanism for inhibiting said touch panel from being depressed when said coincidence detection signal from said coincidence detecting means is not supplied and permitting the depression of said touch panel on condition that said coincidence detection signal is supplied from said coincidence detecting means.

11. A display unit with touch panel as claimed in claim 10, wherein said output control means comprises:

an AND circuit for outputting an AND signal upon receipt of both the coincidence detection signal from said coincidence detecting means and the press detection signal from said press detecting means, and a gate circuit interposed between said operated-position detecting means and the external output terminal and responsive to input of said AND signal to permit the flow of said operated-position detection signal to said external output terminal.

12. A display unit with touch panel as claimed in claim 10, further including a click-touch generating mechanism for providing the operator with a tactile click touch when the operator depresses said touch panel.

13. A display unit with touch panel as claimed in claim 11, further including a click-touch generating mechanism for providing the operator with a tactile click touch when the operator depresses said touch panel.

14. A display unit with touch panel as claimed in claim 10, further including another external output terminal for establishing a flow of said operated-position signal from said operated-position detecting means via a different route from that employed by said output control means.

15. A display unit with touch panel as claimed in claim 11, further including another external output terminal for establishing a flow of said operated-position signal from said operated-position detecting means via a different route from that employed by said output control means.

16. A display unit with touch panel as claimed in claim 12, further including another external output terminal for establishing a flow of said operated-position signal from said operated-position detecting means via a different route from that employed by said output control means.

17. A display unit with touch panel as claimed in claim 13, further including another external output terminal for establishing a flow of said operated-position signal from said operated-position detecting means via a different route from that employed by said output control means.

* * * * *